May 14, 1935.  C. OLDER  2,001,368
FLUID PRESSURE INDICATOR
Filed May 10, 1930  2 Sheets-Sheet 1
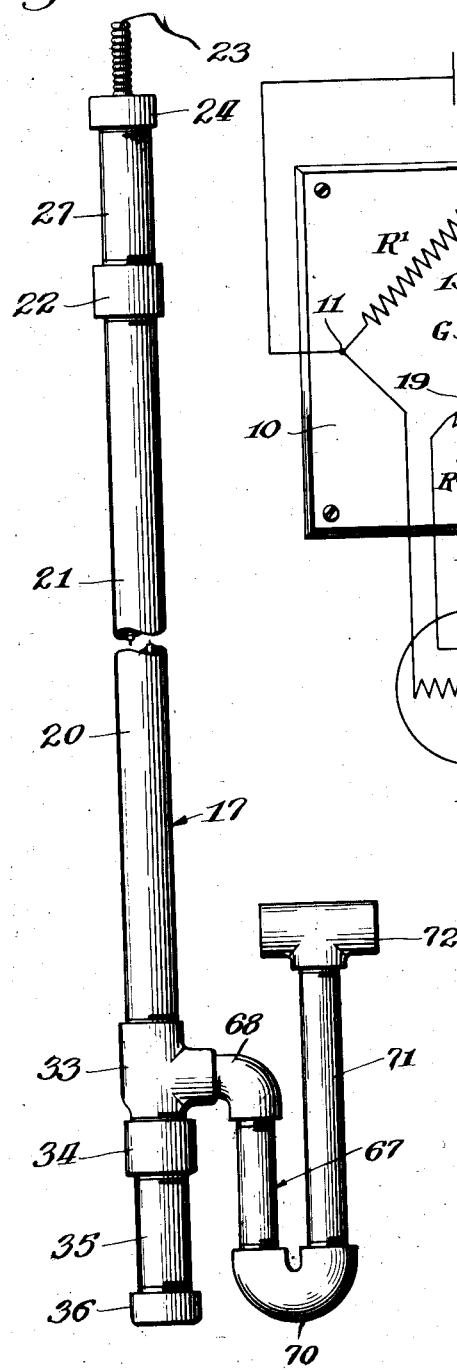
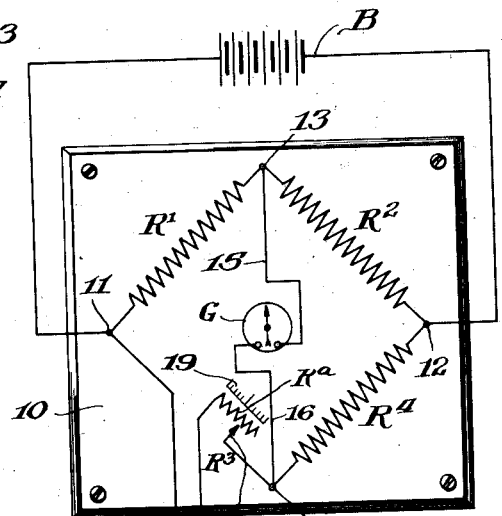
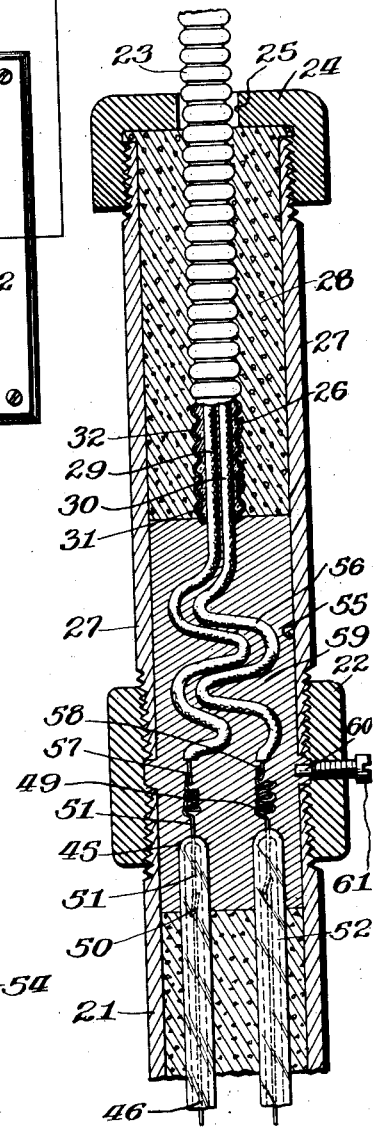
Inventor
Clifford Older
By Williams, Bradbury,
McCaleb & Hinkle
Attys.

May 14, 1935.  C. OLDER  2,001,368
FLUID PRESSURE INDICATOR
Filed May 10, 1930  2 Sheets-Sheet 2

Inventor
Clifford Older
By Williams, Bradbury
McCaleb & Hinkle
Attys.

Patented May 14, 1935

2,001,368

UNITED STATES PATENT OFFICE 2,001,368

FLUID PRESSURE INDICATOR

Clifford Older, Wilmette, Ill.

Application May 10, 1930, Serial No. 451,502

1 Claim. (Cl. 201—55)

The present invention relates to fluid pressure indicators, and is particularly concerned with pressure indicators adapted for indicating or measuring the depth of liquids at remote points. The invention is peculiarly adapted to be used for indicating the depth of water in artesian wells, by taking readings on an instrument located at the surface of the ground, but the device is also of general application and may also be used for indicating at remote points, the fluid pressure at another point, or the depth of water, oil or any liquid in a reservoir tank or the like.

One of the objects of the invention is the provision of an improved liquid depth indicating device, which is capable of indicating at a remote point, the depth of a liquid or other pressure conditions existing at some relatively inaccessible or inconvenient point.

Another object is the provision of an improved liquid depth indicator of the class described, which is peculiarly adapted for indicating the depth of water in artesian wells or the like.

Another object is the provision of a fluid pressure or depth indicator which is simple, economical, durable, accurate and capable of long service with a minimum amount of repair or recalibration.

Another object is the provision of a fluid pressure indicator of the class described, which can be very economically constructed of ordinary stock materials, without the necessity for special machine operations.

Other objects and advantages of the invention will be apparent from the following description and from the accompanying drawings, in which similar characters of reference indicate similar parts throughout the several views.

Referring to the drawings, of which there are two sheets;

Fig. 1 is a side elevational view of the fluid pressure indicating device;

Fig. 2 is a vertical, medial, sectional view taken through the upper part of the pressure responsive device, showing the electrical connections and the mode of enclosing and protecting the conductors;

Fig. 3 is a diagrammatic view of the electrical circuits and instruments utilized in one form of pressure or depth indicating and measuring device employing a Wheatstone bridge;

Fig. 5 is an enlarged detail view showing the mode of connection and insulation of one of the leads to one of the conductors which is in communication with the mercury reservoir.

Figure 4:
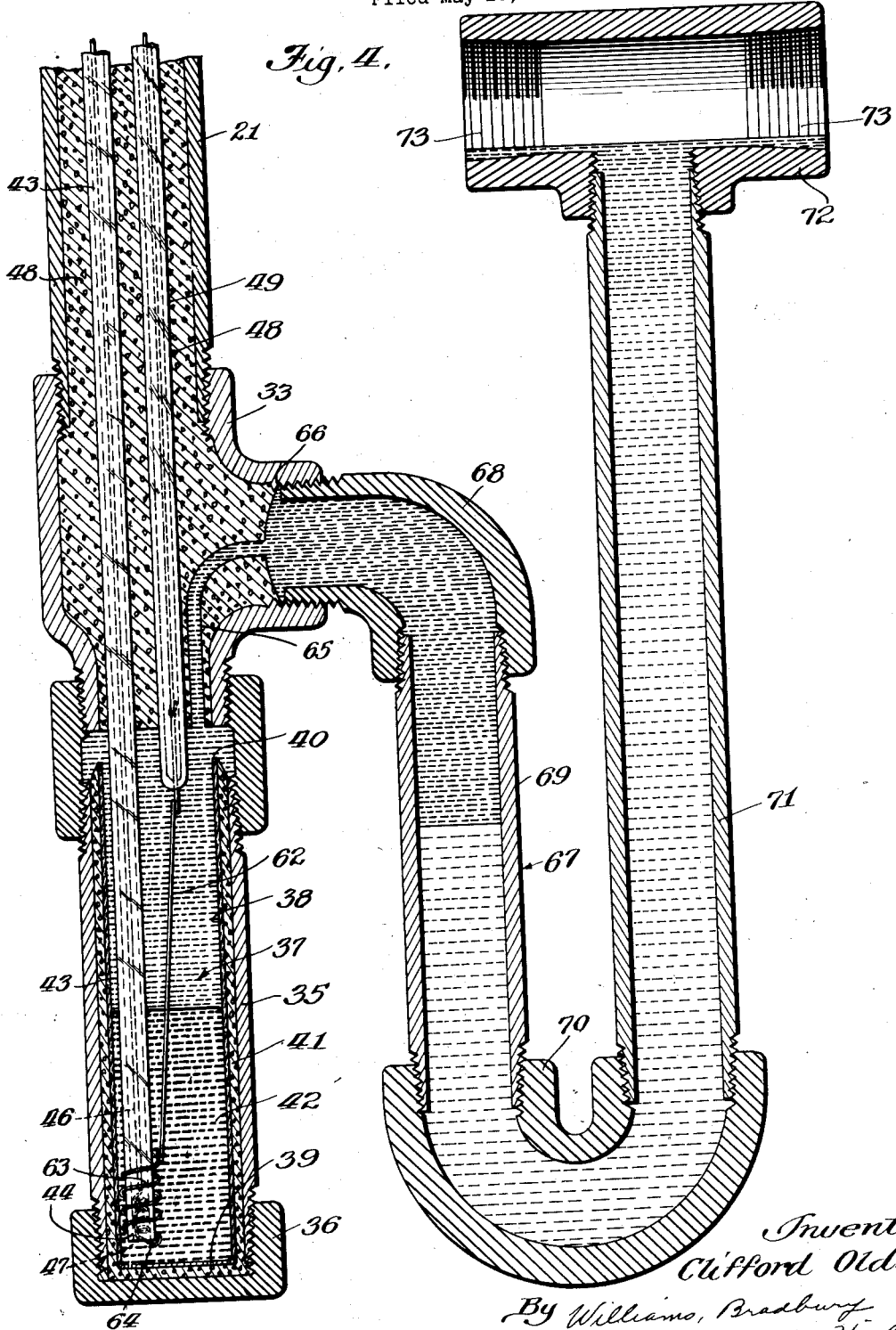
Fig. 4 is a vertical, medial, sectional view through the pressure responsive device, showing the interior structure and operating parts of the device.

Referring to Figs. 1 and 3, the liquid depth indicating devices constructed according to the present invention preferably include some form of electrical measuring instrument which is capable of measurement of the resistance of a circuit, or at least of indication directly responsive to the variation in the resistance of an electric circuit, and one form of such a measuring device is illustrated diagrammatically in Fig. 3, and indicated in its entirety by the numeral 10.

The electrical measuring instrument may consist of any ohmmeter calibrated in terms of fluid pressure or liquid depth, since for practical purposes the pressure of a liquid at any point may be considered to vary directly with the depth of the liquid at that point. Consequently, the electrical instrument may be calibrated either in feet, inches or other units of length, showing the depth of the water or other liquid, or the instrument may be calibrated in units of fluid pressure.

In the present embodiment, the electrical instrument 10 preferably includes a Wheatstone bridge consisting of the resistance members $R_1$, $R_2$, $R_3$ and $R_4$. The Wheatstone bridge may be connected with a source of electromotive force, such as a battery B which is connected to the junctures 11 and 12 of the resistances $R_1$, $R_3$ and $R_2$, $R_4$, respectively. The junctures 13 and 14 of the resistances $R_1$, $R_2$ and $R_3$, $R_4$, respectively, may be joined by conductors 15 and 16 having a galvanometer G interposed between them for the purpose of indicating the condition of electrical balance existing between the resistances of the Wheatstone bridge or the lack of such a balance.

The resistance $R_3$ of the Wheatstone bridge preferably includes an adjustable resistance $R_a$ and the variable resistance $R_x$ consisting of the elements of the pressure responsive device 17 which is to be located in the liquid, or subjected to the fluid pressure to be measured. The adjustable resistance $R_a$ is provided with a movable contact 18 having a pointer which cooperates with a scale 19 preferably calibrated in terms of fluid pressure or units of depth of the liquid to be measured.

Referring to Fig. 1, the pressure responsive device 17 is preferably constructed of ordinary stock materials so as to eliminate the necessity for special machining operations, and in order to resist the pressure and abuse to which such an instrument may be subjected in measuring depth of water in wells or the like, the device is preferably provided with a metallic casing 20.

One form of such a metallic casing may be constructed out of ordinary pieces of pipe, the main body of the casing consisting of a pipe 21 which is threaded at both ends and joined at the top to a coupling 22 provided for the purpose of facilitating connections between the lead cover, and/or armored conductors or leads 23, and the conductors inside the device. The upper end of the casing is preferably provided with a cap 24 having a centrally located aperture 25 adapted to pass the armored cable 23 and the end 26 of the armored cable is secured in the short pipe 27 by means of an initially plastic composition 28 such as Portland cement which is forced into the parts of the pipe 27 and cap 24 about the armored cable 23.

The irregularities of surface of the armored cable may act as anchoring formations for retaining the cable within the cement 28 and for securing the casing 20 to the armor of the cable to provide a support for the pressure responsive device 17 without strain upon the conductors 29, 30 in the cable 23. It should be understood that the conductors or leads 29 and 30 will be provided with the usual form of waterproof insulation and preferably also provided with a lead sheath 31, and an exterior covering of armor 32 or similar protective material.

The pipe 20 which forms the main body of the casing 17 is joined at its lower end to a T fitting 33, the lower end of which may be secured by a coupling 34 to another short section of pipe 35 provided with a lower cap 36 and forming an enclosure for an insulated reservoir 37. The reservoir 37 may consist of a glass lining or tube 38 having its lower end 39 closed and having its upper end 40 open for the reception of certain conductors, further to be described, and for access to fluid under pressure.

The insulating lining 38 may be secured in its casing 35 by partially filling the casing 35 with an initially plastic composition such as a Portland cement composition 41 and forcing the lining 38 into the composition while plastic, in such manner that all parts of the space between the lining and the pipe 35 are filled with the composition.

The reservoir 37 is provided with a body of electrically conducting liquid 42 such as mercury, and the reservoir is also provided with an elongated tubular or hollow member 43 such as a glass tube, having its lower end 44 open and its upper end 45 sealed against entrance of air or other fluids. The glass tube 43 is preferably of sufficient size so that the mercury may flow into the tube when the tube is turned upon its side with the reservoir 37 sufficiently full to cover the end 44 of tube 43, thereby providing a very convenient and simple method of evacuating the air from the upper end 45 of tube 43.

The tube 43 also provides an enclosure for an electrical conductor 46 of relatively high resistance, and substantially uniform cross section, and the conductor 46 preferably consists of a resistance wire which is preferably maintained substantially straight and taut by means of a resilient member or spring 47 further to be described.

The cross section of the high resistance conductor 46 should be substantially uniform in order to make the variations in resistance of the combined circuit of the mercury and resistor 46, directly proportional to the variation in fluid pressure, but many of the advantages of the present instrument may be realized by utilizing any form of resistance 46 and calibrating the scale 19 for each of the various points of units of measurement. The provision of a uniform resistance enables the interpolation, with a high degree of accuracy, upon the scale 19 of figures not found by direct calibration.

The tube 43 should also preferably be of substantially uniform cross section, since the cross section of the tube 43 determines the cross section of the mercury column which is forced into the tube by the pressure conditions to which the device is subjected, but the uniform cross section of the mercury column is not such an important factor in the maintenance of accuracy as the uniform cross section of the wire, since the mercury column will present a relatively low resistance compared to the wire 46.

The pipe 21 and major part of the T fitting 33 are preferably also filled with an initially plastic cementitious composition 48 for the purpose of enclosing the mercury reservoir 37 and providing support and protection for the tubular member 43, resistance 46 and another conductor 49. The tubular member 43 may thus be permanently secured in the cement 48 before the parts are assembled, the lower end 44 of the tube projecting sufficiently from the cement 48 to be immersed in the mercury 42 and the end 44 should preferably be located near the bottom 39 of reservoir 37 to utilize the maximum range of the measuring device.

At its upper end the high resistance conductor 46 is joined as at 50 to a lead-in wire 51 having substantially the same co-efficient of expansion as glass, so that the lead-in wire 51 may be sealed in the end 45 of glass tube 43.

The other conductor 49 may also be enclosed in a glass tube 52 which preferably projects below the lower surface of cement 48 in the T fitting 33, and the lower end of tube 52 is also preferably provided with a lead-in wire 53 which may be sealed in the glass at the end of tube 52. The glass tube 52 may be filled with paraffin 54 or other plastic insulating material and at the upper end of tube 52 the conductor 49 projects into the connection chamber 55, which is made accessible by means of the coupling 22.

The conductors 29 and 30 leading from the armored cable 23 are preferably provided with sufficient slack 56 within the connection chamber 55 to permit the separation of these parts and the formation of soldered joints 57, 58 and the pipes 21 and 27 may be joined without twisting the conductors by the use of a coupling 22 having right-hand and left-hand threads.

The conductors 29 and 30 are preferably provided with the rubber insulation down to the joints 57 and 58 and the joints are covered with wrappings of rubber and friction tape to provide an equivalent covering of insulation from the rubber covering to the glass tubes 43 and 52.

The connection chamber 55 is then preferably filled with an insulating composition 59 such as paraffin, which is injected through an opening 60 under pressure and the opening 60 may be closed by a threaded filling plug 61.

The body of mercury 42 is electrically connected to the conductor 49 and in some embodiments of the invention, the conductor 49 may be introduced into the mercury 42 below the surface of the mercury. In the present embodiment, the conductor 49 and lead-in wire 53 are connected to a low resistance conductor 62 which extends into the upper surface of mercury 42 and is electrically connected to high resistance conductor 46 by means of spring 63.

In order that both of the conductors 46 and 62 may be maintained substantially straight, so as to have a uniform resistance effect when immersed in mercury 42, the lower end of tube 43 preferably supports and guides the springs 47, 63, which place the conductors 46, 62 under tension. The springs 47 and 63 being immersed in mercury, they do not conduct much of the current, and consequently the springs may be made of tempered steel.

One convenient form of spring device for maintaining such tension is illustrated in Fig. 4, comprising a unitary spring member having a small helical part 47 disposed inside the end of tube 43 and having its end joined to conductor 46. At the lower end of the helical spring 47 the spring is provided with spirals 64 of greater diameter and resting upon the end 44 of tube 43. The spring is then extended into the helical portion 63 located outside of tube 43 and having its end secured to conductor 62. The particular form of spring illustrated is easily applied and economically constructed, and the coils of the springs 47 and 63 are supported and guided by the walls of the tube 43 in such manner as to maintain conductors 46 and 62 under substantially uniform tension. It will be understood that in some embodiments of the invention, relatively stiff conductors 46 and 62 may be employed, in which case the springs may be eliminated, but where flexible conductors or resistances are utilized, uniformity of action cannot be secured unless such conductors are maintained substantially straight, and in relatively fixed position.

The cementitious composition 48 is formed with a conduit 65 leading from the reservoir 37 out of the side opening 66 of T fitting 33, in order to permit access of fluid under pressure to the reservoir 37. In order to prevent the loss of mercury and other fluids utilized, the pressure device 20 is preferably provided with a liquid trap 67 having a downwardly and upwardly extending conduit. Such a liquid trap may be constructed by connecting an elbow 68 to the opening 66 of T fitting 33, the elbow 68 extending downward and being connected to a pipe 69 which is joined to one end of a U fitting 70. The other end of U fitting 70 is joined to an upwardly extending pipe 71 which may also be provided with a T fitting 72.

The T fitting 72 provides the end of the pipe 71 with laterally projecting openings 73 so as to prevent access to the pipe 71 of foreign material, such as dirt, although the pipe 71 is readily accessible to the entrance of water or other liquids.

In order to exhaust the air from the upper end of tube 43, the mercury reservoir 37 is provided with sufficient mercury to cover the end 44 of tube 43 when the device is held with the left side in Fig. 4, substantially horizontal, or with the end 44 slightly upward. When the mercury has run into the tube 43, substantially filling the tube, the device is suddenly turned to upright position, after which the mercury falls in tube 43 to a position which depends upon the air pressure at that particular time and place, and the space above the mercury in the tube 43 may be considered a vacuum for all practical purposes.

The space in the reservoir 37 above mercury 42 is preferably filled with an insulating fluid such as ordinary transformer oil or automobile lubricating oil and the oil is maintained on top of the mercury by the relatively great difference in the specific gravities of these two liquids. The oil also extends over into the pipe 69, the upper part of pipe 69 and elbow 68 being filled with oil, and the lower part of pipe 69 with a mixture of oil and water, and when the device is immersed in water, the remainder of the elbow 67 is filled with water, the pressure of which is directly proportional to the depth of the water.

Referring to Fig. 5, this is a detail, vertical, sectional view of a modified form of connection between the conductor 62 and lead 30. In this embodiment the glass tube 52 is made of sufficient size so that the tube is adapted to receive the rubber insulation, and after the splice is made between the electrical conductors, the tube 52 may be filled with paraffin, the rubber insulation inserted into the tube until the tube engages the lead casing and the joint between the glass and lead may be covered with friction tape.

The operation of the fluid pressure indicator is as follows.

The normal resistance of the combined circuit, including conductors 62, mercury 42 and resistance 46, is sufficient so that the pointer 18 on the variable resistance $R_a$ points to zero when no pressure is impressed upon the pressure device. If desired, the calibration of the resistance $R_a$ may take into consideration the general elevation of the liquid surface above sea level and the barometric pressure at the time the measurement is made, or the readings may be corrected by calculations for the sea level and the existing barometric pressure.

When the pressure responsive device 17 is immersed in water or subjected to other pressure conditions, the pressure of the water or other fluid is transmitted through the oil to the mercury 42 and the mercury is forced upward into the tube 43, covering a greater portion of the resistance 46 and diminishing the effective resistance of the circuit, which includes the mercury and resistance 46 by an amount which depends upon the difference between the resistance per unit length of the wire 46 and the resistance per unit length of the column of mercury.

At the same time, the general level of the mercury in the reservoir or well 37 is lowered, exposing a greater part of the wire 62, but the wire 62 is of relatively low resistance so that this effect may be neglected, or the actual pressure may be calibrated upon scale 19 by actual test of predetermined pressures.

When the pressure responsive device 17 is immersed in liquid at a certain depth, the combined resistance $R_x$ including the wire 46, the column of mercury and the body 42 of mercury is changed to a predetermined value, depending upon the depth at which the device is located. This resistance may be directly measured upon an ohmmeter calibrated in terms of pressure or liquid depth, or with the electrical instrument illustrated in Fig. 3 the adjustable resistance $R_a$ may be increased to bring the combined resistance $R_3$ of this portion of the Wheatstone bridge back to the initial resistance value.

The lack of balance of the Wheatstone bridge when the pressure responsive device 17 is immersed in the liquid, will be indicated by the galvanometer G, which shows the flow of current between junctures 13 and 14, and the resistance $R_a$ should be adjusted to a joint where no current flows between the points 13 and 14 and the galvanometer needle registers substantially at zero. The pointer 18 will then indicate on the scale 19 the pressure conditions existing in the liquid at the remote point where the device 17 is immersed, and if necessary or desirable, corrections may be made for the existing barometric pressure and the height above sea level at which the device is used.

It will thus be observed that the present fluid pressure indicator is capable of measuring or indicating the depth of a liquid such as the water in an artesian well, by means of readings taken at some remote point, such as at the surface of the ground. The pressure conditions existing in the pressure device 17 vary only slightly from that of the water or other liquid in which it is suspended, and therefore only ordinary precautions need be taken to secure tightness in screwing the various pipe fittings together.

All passages in the pressure device may be made relatively large, so that there is but slight danger of sediment clogging any of the passages and obstructing ready response of the instrument to changes of pressure, and should the waterproof cable become damaged at any time, it may readily be replaced by disconnection at the coupling 22 of the pressure device 17, splicing on a new top section with cable attached, and refilling the spliced chamber with initially plastic insulating oil as described.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim is new and desire to secure by Letters Patent of the United States, is:

In a fluid depth indicator, a housing made of standard pipe fittings comprising a first pipe fitting with a T fitting, said T fitting being joined by a nipple to a second lower pipe having a lower cap and forming a reservoir, an elbow joined to said T fitting and extending downwardly, a downwardly extending pipe carried by said elbow, a U fitting secured thereto and an upwardly extending pipe secured to said U fitting, a pair of electrodes mounted in the first-mentioned pipe and secured by a cementitious filling therein, a body of mercury in said reservoir, said reservoir having an insulating lining, one of said electrodes being enclosed in an insulating tube, and the other of said electrodes being exposed in said mercury, one of said electrodes being of high resistance and immersible in the mercury at depths varying in accordance with the pressure of the liquid the depth of which is to be indicated, resilient means for drawing both of said electrodes taut, a fluid lighter than the liquid of which depth is to be indicated filling said reservoir and extending over into said elbow and the pipe depending therefrom, the balance of said pipes, extending downward and upward, being filled with the fluid the depth of which is to be indicated.

CLIFFORD OLDER.